US008882169B2

(12) United States Patent
Tanaka et al.

(10) Patent No.: US 8,882,169 B2
(45) Date of Patent: Nov. 11, 2014

(54) LOCK STRUCTURE FOR SEAT BACK OF VEHICLE SEAT

(71) Applicant: Suzuki Motor Corporation, Shizuoka-ken (JP)

(72) Inventors: Yoshinori Tanaka, Shizuoka-ken (JP); Tatsuro Shimizu, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/968,901

(22) Filed: Aug. 16, 2013

(65) Prior Publication Data

US 2014/0138979 A1    May 22, 2014

(30) Foreign Application Priority Data

Nov. 19, 2012   (JP) .................. 2012-253445

(51) Int. Cl.
*B60N 2/02*   (2006.01)
*B60N 2/22*   (2006.01)

(52) U.S. Cl.
CPC .................... *B60N 2/2245* (2013.01)
USPC .................................... 296/65.03

(58) Field of Classification Search
CPC .................. B60G 2400/204; B60G 2800/012; B60G 2200/31; B60G 2200/341; B60G 2200/44; B60R 8/04; B60R 7/02; B60N 2/305; B60N 2/3011; B60N 2/3013; B64D 11/003
USPC ................ 296/65.03, 64, 65.01, 353, 378.12, 296/378.13; 297/313, 353, 378.12, 378.13; 414/921
See application file for complete search history.

(56) References Cited

U.S. PATENT DOCUMENTS

| | | | | |
|---|---|---|---|---|
| 6,158,799 | A * | 12/2000 | Guilford | 296/65.01 |
| 6,817,646 | B2 * | 11/2004 | Kikuchi et al. | 296/65.05 |
| 7,032,973 | B2 * | 4/2006 | Reubeuze | 297/378.13 |
| 7,484,807 | B2 * | 2/2009 | Okazaki et al. | 297/378.13 |
| 7,658,428 | B2 * | 2/2010 | Tietje | 296/63 |
| 8,226,147 | B2 * | 7/2012 | Bruck et al. | 296/65.16 |
| 8,251,429 | B2 * | 8/2012 | Lindsay et al. | 296/65.16 |
| 8,251,430 | B2 * | 8/2012 | Ishii et al. | 296/65.16 |
| 8,267,458 | B2 * | 9/2012 | Lindsay | 296/65.16 |
| 8,291,734 | B2 * | 10/2012 | Kan et al. | 70/268 |
| 8,353,551 | B2 * | 1/2013 | Bruck | 296/65.16 |
| 8,353,552 | B2 * | 1/2013 | Scheurer et al. | 296/65.16 |
| 8,408,630 | B2 * | 4/2013 | Saito et al. | 296/65.13 |
| 8,439,445 | B2 * | 5/2013 | Perkins et al. | 297/378.13 |
| 8,662,561 | B2 * | 3/2014 | Runde et al. | 296/65.09 |
| 8,720,927 | B2 * | 5/2014 | Ball et al. | 280/278 |
| 2003/0230908 | A1 * | 12/2003 | Nozaki | 296/65.16 |
| 2007/0273171 | A1 * | 11/2007 | Ito et al. | 296/65.16 |

(Continued)

FOREIGN PATENT DOCUMENTS

JP   2002-282076   10/2002

*Primary Examiner* — Kiran B Patel
(74) *Attorney, Agent, or Firm* — Myers Bigel Sibley & Sajovec, P.A.

(57) ABSTRACT

A lock structure for a seat back of a vehicle seat which can improve the durability of a striker main body is provided. A striker 10 is provided on a vehicle body side and includes a base portion 11 fixed to the vehicle body and a striker main body 15 protruding from the base portion toward a vehicle front side, and the multiple engaged portions K1, K2 are provided in end sections 13M, 14M of the striker main body 15 on the vehicle front side Fr to be spaced away in the vehicle front-rear direction.

5 Claims, 4 Drawing Sheets

(56) References Cited

U.S. PATENT DOCUMENTS

| | | | |
|---|---|---|---|
| 2008/0129017 A1* | 6/2008 | Okazaki et al. | 280/727 |
| 2008/0296951 A1* | 12/2008 | Goshima et al. | 297/378.13 |
| 2012/0133188 A1* | 5/2012 | Wieclawski et al. | 297/378.13 |
| 2012/0139312 A1* | 6/2012 | Kato et al. | 297/330 |

* cited by examiner

LOCK STRUCTURE FOR SEAT BACK OF VEHICLE SEAT

RELATED APPLICATION

This application claims priority from Japanese Patent Application No. 2012-253445, filed Nov. 19, 2012, the disclosure of which is incorporated by reference herein in its entirety.

FIELD AND BACKGROUND OF THE INVENTION

The present invention relates to a lock structure for a seat back of a vehicle seat, having: a striker including multiple engaged portions and provided on a vehicle body side; and an engaging portion provided in a seat back capable of tilting in a vehicle front-rear direction, the engaging portion being configured to selectively engage with any one of the multiple engaged portions to lock the seat back in an inclined posture, an inclination angle of the seat back in the inclined posture being different depending on the selected engaged portion.

Conventionally, the striker includes: a base portion fixed to a lateral portion of the vehicle body; and a striker main body protruding from the base portion toward a vehicle width direction inner side.

The striker main body is formed of an annular rod. The annular rod is supported on the lateral portion of the vehicle body to be turnable about a shaft extending in a vehicle front-rear direction. Moreover, the rod is provided with paired rod portions orthogonal to each other and a first engaged portion and a second engaged portion are formed respectively and individually in the paired rod portions. Furthermore, the rod is turned about the shaft to be switched between a first locking state in which the engaging portion of the seat back engages with the first engaged portion and a second locking state in which the engaging portion engages with the second engaged portion.

SUMMARY OF THE INVENTION

In the conventional structure described above, the annular rod, which is the striker main body, protrudes from the base portion fixed to the lateral portion of the vehicle body toward the vehicle width direction inner side. Hence, when force toward the vehicle front side is applied to the seat back, a bending load is applied to the rod from the engaging portion of the seat back. Accordingly, the strength of the rod depends largely on the diameter of the rod.

When the diameter of the rod is increased, the weight of the striker is increased. Although there is a technique in which the diameter of the rod is not increased and a reinforcement is added to the striker, the weight is increased in this technique as well. In addition, the number of parts is increased.

An object of the present invention is to provide a lock structure for a seat back of a vehicle seat in which a striker main body can sufficiently withstand force applied thereto from an engaging portion of the seat back and which can thus prevent deformation of the striker main body and improve durability of the striker main body while achieving weight reduction and reduction in the number of parts.

A feature of the present invention is as follows. Provided is a lock structure for a seat back of a vehicle seat, including: a striker including a plurality of engaged portions and provided on a vehicle body side; and an engaging portion provided in a seat back capable of tilting in a vehicle front-rear direction, the engaging portion being configured to selectively engage with any one of the plurality of engaged portions to lock the seat back in an inclined posture, and an inclination angle of the seat back in the inclined posture being different depending on the selected engaged portion, wherein the striker includes: a base portion fixed to the vehicle body; and a striker main body protruding from the base portion toward a vehicle front side, and the plurality of the engaged portions are provided in an end section of the striker main body on the vehicle front side to be spaced away in the vehicle front-rear direction.

In the configuration described above, the striker main body protrudes from the base portion fixed to the vehicle body toward the vehicle front side. Accordingly, when force toward the vehicle front side is applied to the seat back, a tensile load is applied to the striker main body from the engaging portion of the seat back.

In such a structure, the strength of the striker main body is relatively less dependent on the diameters of members (for example, rods) constituting the striker main body. As a result, this structure is advantageous in strength and can avoid an increase in the diameters of the members constituting the striker main body and an increase in weight due to addition of a reinforcement. Moreover, an increase in the number of parts can be suppressed.

Hence, the striker main body can sufficiently withstand force applied thereto from the engaging portion of the seat back and the lock structure can thereby prevent deformation of the striker main body and improve the durability of the striker main body while achieving weight reduction and reduction in the number of parts.

In the present invention, in a case in which: the striker main body includes an inner rod having a semi-annular shape in a plan view, the inner rod protruding from the base portion toward the vehicle front side, and an outer rod having a semi-annular shape in the plan view, the outer rod protruding from the base portion toward the vehicle front side and surrounding the inner rod; an end section of the inner rod on the vehicle front side and an end section of the outer rod on the vehicle front side are arranged to be spaced away in the vehicle front-rear direction; and the plurality of engaged portions are provided respectively and individually in the end section of the inner rod on the vehicle front side and the end section of the outer rod on the vehicle front side, the following effects can be obtained.

The striker main body includes the inner rod and the outer rod. Accordingly, when force toward the vehicle front side is applied to the seat back, a tensile load is applied to the inner rod and the outer rod from the engaging portion of the seat back.

In such a structure, the strength of the striker main body is relatively less dependent on the diameters of the inner rod and outer rod. As a result, this structure is advantageous in strength and can avoid an increase in the diameters of the inner rod and outer rod and an increase in weight due to addition of a reinforcement. Moreover, an increase in the number of parts can be suppressed.

Hence, the striker main body can sufficiently withstand force applied thereto from the engaging portion of the seat back and the lock structure can thereby prevent deformation of the striker main body (bending of the inner rod and the outer rod) and improve the durability of the striker main body while achieving weight reduction and reduction in the number of parts.

In the present invention, in a case in which both of lateral sections of the outer rod in a vehicle width direction are fitted on both of lateral sections of the inner rod in the vehicle width direction, the following effects can be obtained.

Since both lateral sections of the outer rod in the vehicle width direction are fitted on both lateral sections of the inner rod in the vehicle width direction, the one lateral section of the inner rod on the vehicle width direction inner side and the one lateral section of the outer rod on the vehicle width direction inner side can support each other while the other lateral section of the inner rod on the vehicle width direction outer side and the other lateral section of the outer rod on the vehicle width direction outer side can support each other.

As a result, the strength of the inner rod and the outer rod (striker main body) against loads toward the vehicle front side and a vehicle lower side can be improved.

In the present invention, in a case in which: one lateral section of the base portion is fixed to a lateral portion of the vehicle body and the base portion protrudes from the lateral portion of the vehicle body toward the vehicle width direction inner side; the inner rod has an end portion, on a vehicle rear side, of the one lateral section on the vehicle width direction inner side and an end portion, on the vehicle rear side, of the other lateral section on the vehicle width direction outer side which are fixedly attached to the base portion by welding; the outer rod has an end portion, on the vehicle rear side, of the one lateral section on the vehicle width direction inner side which is fixedly attached to the base portion by welding and the other lateral section on the vehicle width direction outer side is fixedly attached to the other lateral section of the inner rod by welding; and an end portion, on the vehicle rear side, of the other lateral section of the outer rod is disposed away from, and on the vehicle front side of, the base portion, the following effects can be obtained.

Since the one lateral section of the inner rod on the vehicle width direction inner side and the one lateral section of the outer rod on the vehicle width direction inner side are located farther away from, and on the vehicle width direction inner side of, the lateral portion of the vehicle body than the other lateral section of the inner rod on the vehicle width direction outer side and the other lateral section of the outer rod on the vehicle width direction outer side are, the one lateral section of the inner rod and the one lateral section of the outer rod are more likely to be bent and deformed.

In the configuration described above, in such a structure, a region of one lateral section of the striker main body (the inner rod and the outer rod) on the vehicle width direction inner side which is fixedly attached to the base portion by welding is larger than a region of the other lateral section of the striker main body on the vehicle width direction outer side which is fixedly attached to the base portion by welding. Accordingly, the resistance of the striker main body (the inner rod and the outer rod) against a bending load can be improved.

Moreover, since the end portion, on the vehicle rear side, of the other lateral section of the outer rod is disposed away from, and on the vehicle front side of, the base portion, the length of an outer rod material can be reduced compared to, for example, a structure in which the end portion, on the vehicle rear side, of the other lateral section of the outer rod is fixedly attached to the base portion by welding. Accordingly, it is possible to reduce the material cost and reduce the weight.

In the present invention, in a case in which: one lateral portion of the base portion is fixed to a lateral portion of the vehicle body and the base portion protrudes from the lateral portion of the vehicle body toward the vehicle width direction inner side; the inner rod has an end portion, on the vehicle rear side, of the one lateral section on the vehicle width direction inner side and an end portion, on the vehicle rear side, of the other lateral section on the vehicle width direction outer side which are fixedly attached to the base portion by welding; both of the lateral sections of the outer rod in the vehicle width direction are fixedly attached respectively and individually to both of the lateral sections of the inner rod by welding in the vehicle width direction; and end portions, on the vehicle rear side, of both of the lateral sections of the outer rod in the vehicle width direction are disposed away from, and on the vehicle front side of, the base portion, the following effects can be obtained.

Since the end portions, on the vehicle rear side, of both lateral sections of the outer rod in the vehicle-width-direction are disposed away from, and on the vehicle front side of, the base portion, the length of an outer rod material can be reduced compared to, for example, a structure in which the end portions, on the vehicle rear side, of both lateral sections of the outer rod in the vehicle width direction are fixedly attached to the base portion by welding. Accordingly, it is possible to reduce the material cost and reduce the weight.

As described above, the end portions, on the vehicle rear side, of both lateral sections of the outer rod in the vehicle width direction are disposed away from, and on the vehicle front side of, the base portion. However, since both lateral sections of the outer rod in the vehicle width direction are fixedly attached respectively and individually to both lateral sections of the inner rod in the vehicle width direction, it is possible to firmly integrate the inner rod and the outer rod to each other and improve the strength of the inner rod and the outer rod.

The present invention can provide a lock structure for a seat back of a vehicle seat in which a striker main body can sufficiently withstand force applied thereto from an engaging portion of the seat back and which can thus prevent deformation of the striker main body and improve durability of the striker main body while achieving weight reduction and reduction in the number of parts.

DESCRIPTION OF THE EMBODIMENTS OF THE INVENTION

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Unless otherwise defined, all technical and scientific terms used herein have the same meaning as commonly understood by one of ordinary skill in the art to which this invention belongs. All references cited are incorporated herein by reference in their entirety.

Modes for carrying out the present invention are described below based on the drawings.

Figure 1:
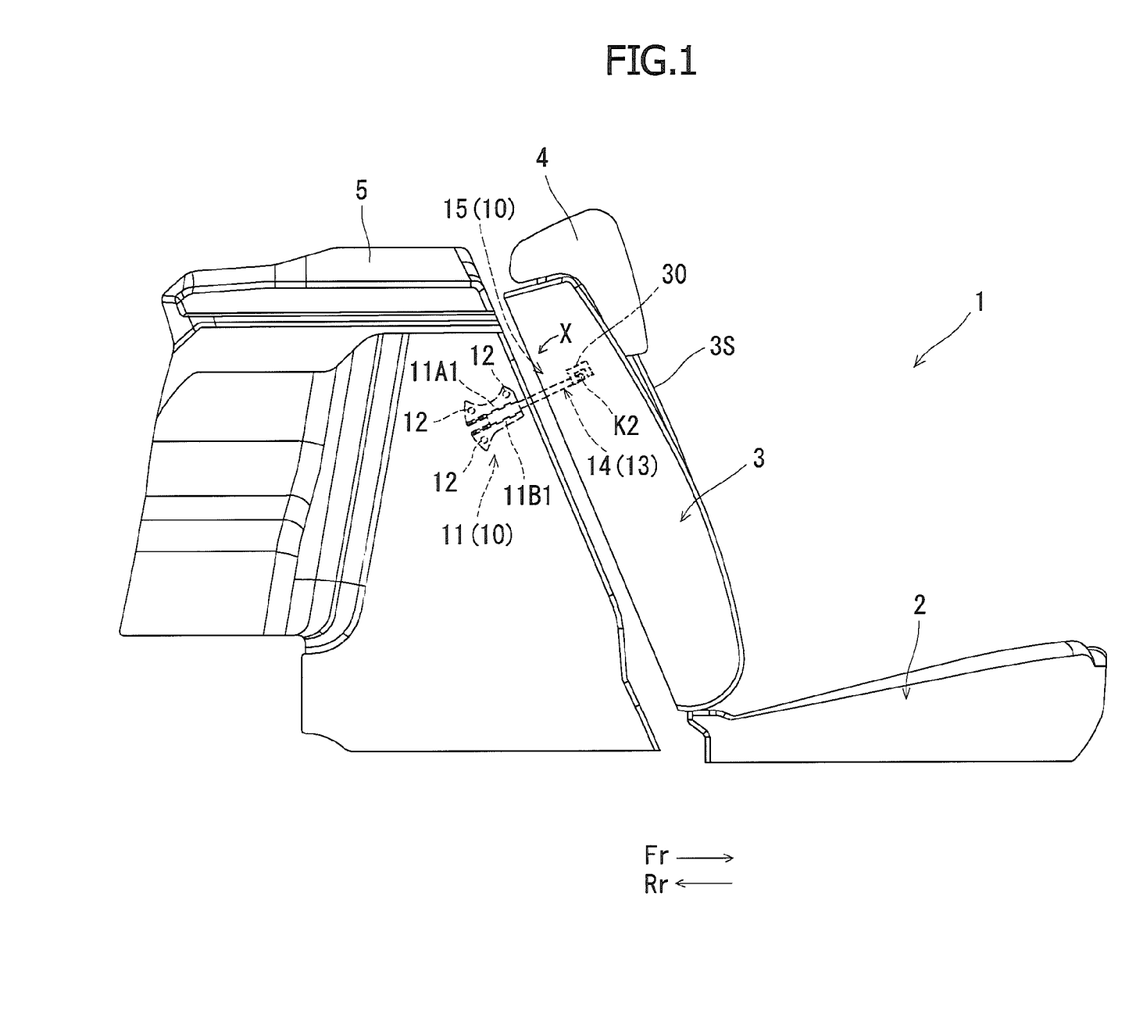
FIG. 1 is a side view of a vehicle seat (rear seat).

FIG. 1 shows a rear seat 1 (corresponding to a vehicle seat) provided in a vehicle cabin of an automobile. The rear seat 1 is formed of a seat cushion 2 and a seat back 3.

The seat back 3 includes a seat back frame, a seat back pad supported by the seat back frame, and a skin material covering the seat back pad. Moreover, a head rest 4 is connected to an upper end portion of the seat back frame. The seat back 3 is configured to be capable of tilting in a vehicle front-rear direction about a lower horizontal shaft (i.e. with the lower horizontal shaft being at the center).

Figure 3:
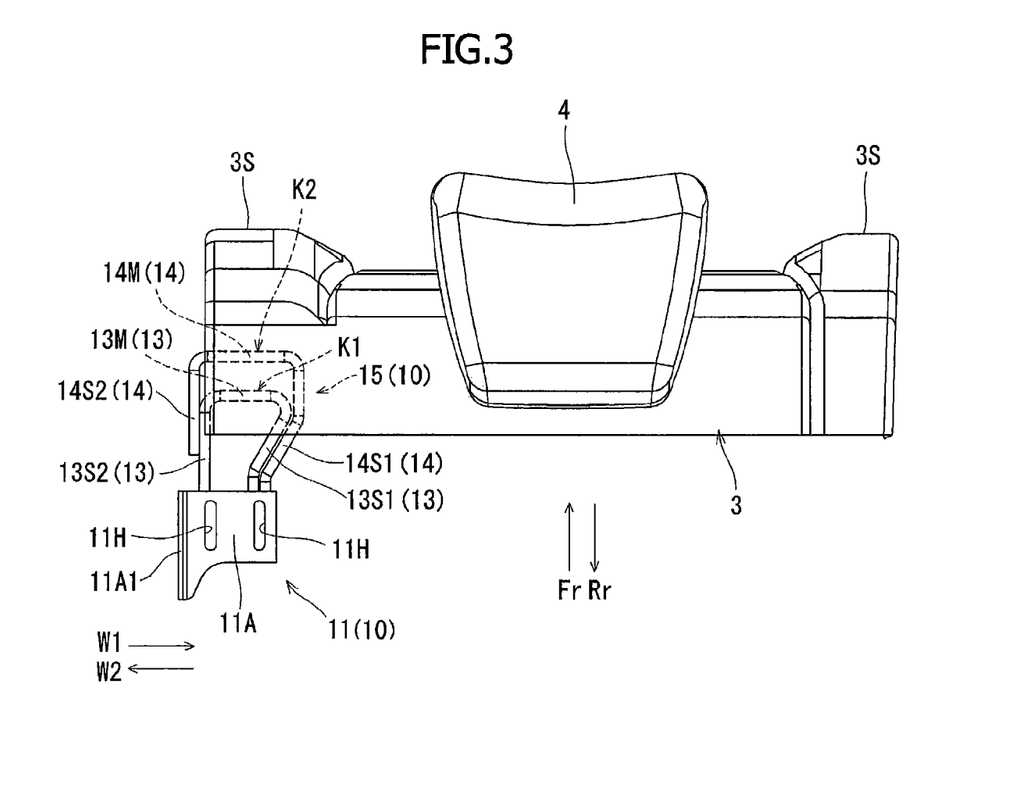
FIG. 3 is a plan view of the vehicle seat (rear seat).

The seat back pad is made of urethane foam. As shown in FIG. 3, both of side portions 3S of the seat back 3 are configured to bulge to a vehicle front side Fr (seat front side) and hold the upper body of a passenger (seated person) in a width direction of the seat back 3.

[Lock Structure for Seat Back 3]

Figure 2:
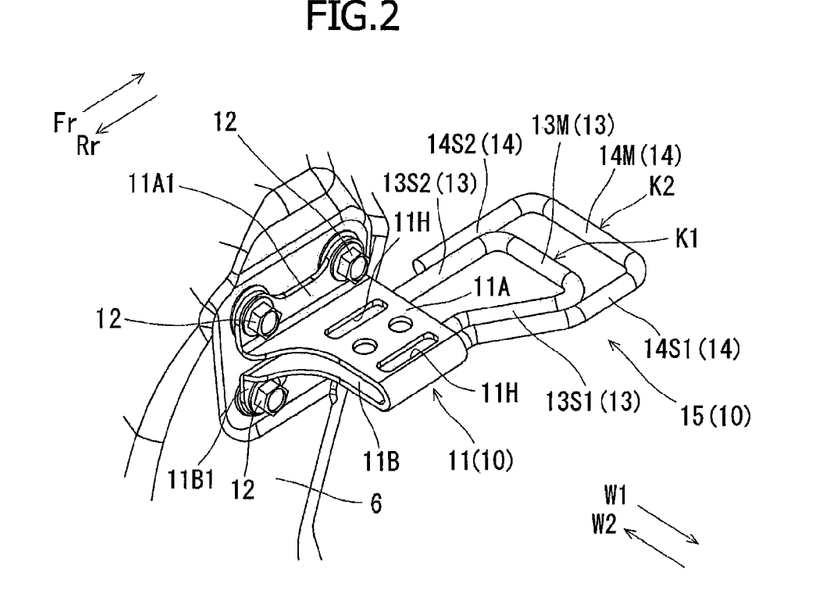
FIG. 2 is a perspective view of a striker.

As shown in FIGS. 1 to 3, a striker 10 including multiple engaged portions K1, K2 is provided on a vehicle body side and an engaging portion 30 is provided in the seat back 3. Moreover, the engaging portion 30 is configured to selectively engage with any one of the multiple engaged portions K1, K2 to lock the seat back 3 in an inclined posture. An inclination angle of the seat back 3 in the inclined posture is different depending on the selected one of the engaged portions K1, K2.

[Structure of Striker 10]

As shown in FIGS. 2 to 5, the striker 10 includes: a base portion 11 fixed to a reinforcement 6 (corresponding to a vehicle body, see FIG. 1) in a vehicle body lateral portion; and a striker main body 15 protruding from the base portion 11 toward the vehicle front side Fr. The reinforcement 6 is covered with a quarter trim 5 (see FIG. 1).

[Structure of Base Portion 11]

The base portion 11 is formed by pressing a single sheet of metal plate material and is formed in a U-shape with a vehicle width direction outer side W2 (vehicle body lateral portion side) opened in a vertical cross section as viewed in the vehicle front-rear direction (see FIG. 2). Moreover, an end portion of an upper piece 11A of the base portion 11 on the vehicle width direction outer side W2 is bent upward to be formed into an attachment flange 11A1 while an end portion of a lower piece 11B of the base portion 11 on the vehicle width direction outer side W2 is bent downward to be formed into an attachment flange 11B1.

Moreover, as shown in FIG. 2, bolts 12 are inserted into bolt insertion holes formed in both of the attachment flanges 11A1, 11B1 and both attachment flanges 11A1, 11B1 are fixed to the reinforcement 6. One lateral portion of the base portion 11 is thus fixed to the lateral portion of the vehicle body and the base portion 11 protrudes from the lateral portion of the vehicle body toward a vehicle width direction inner side W1.

Each of edges of the upper and lower pieces 11A, 11B on the vehicle front side Fr is formed in a linear shape extending in the vehicle width direction. Moreover, in each of edges of upper and lower pieces 11A, 11B on a vehicle rear side Rr, a portion other than a base end portion extends in a vehicle width direction while the base end portion is gently curved toward the vehicle rear side Rr as extending to the vehicle width direction outer side W2. As a result, while the base portion 11 has a small structure, the strength of the base portion 11 is improved. Multiple through holes 11H for welding the striker main body 15 to the base portion 11 are formed in both of the upper and lower pieces 11A, 11B.

[Structure of Striker Main Body 15]

The striker main body 15 includes: an inner rod 13 having a semi-annular shape in a plan view, the inner rod 13 protruding from the base portion 11 toward the vehicle front side Fr; and an outer rod 14 having a semi-annular shape in the plan view, the outer rod 14 protruding from the base portion 11 toward the vehicle front side Fr and surrounding the inner rod 13. The inner rod 13 and the outer rod 14 are each formed by bending a solid bar with a circular cross section. The outer diameter of the inner rod 13 and the outer diameter of the outer rod 14 are the same.

[Structure of Inner Rod 13]

The inner rod 13 is formed of: a front end section 13M (an end section on the vehicle front side Fr) which extends in the vehicle width direction; one lateral section 13S1 on the vehicle width direction inner side W1 which extends from an end portion of the front end section 13M on the vehicle width direction inner side W1 toward the vehicle rear side Rr; and another lateral section 13S2 on the vehicle width direction outer side W2 which extends from an end portion of the front end section 13M on the vehicle width direction outer side W2 toward the vehicle rear side Rr.

A front half (a portion on the vehicle front side Fr) of the one lateral section 13S1 of the inner rod 13 is inclined toward the vehicle width direction outer side W2 as linearly extending to the vehicle rear side Rr. End portions, on the vehicle rear side Rr, of both lateral sections 13S1, 13S2 of the inner rod 13 in the vehicle width direction are interposed between the upper piece 11A and the lower piece 11B of the base portion 11 and are fixedly attached to the upper and lower pieces 11A, 11B by welding. Reference symbol W in FIG. 4 denotes welded portions.

[Structure of Outer Rod 14]

The outer rod 14 is formed of: a front end section 14M (an end section on the vehicle front side Fr) which extends in the vehicle width direction; one lateral section 14S1 on the vehicle width direction inner side W1 which extends from an end portion of the front end section 14M on the vehicle width direction inner side W1 toward the vehicle rear side Rr; and another lateral section 14S2 on the vehicle width direction outer side W2 which extends from an end portion of the front end section 14M on the vehicle width direction outer side W2 toward the vehicle rear side Rr.

The one lateral section 14S1 of the outer rod 14 is formed to extend to the vehicle rear side Rr beyond the other lateral section 14S2 and a longitudinal-direction intermediate portion of the one lateral section 14S1 is inclined toward the vehicle width direction outer side W2 as linearly extending to the vehicle rear side Rr. An inclination angle of the longitudinal-direction intermediate portion with respect to the vehicle front-rear direction is the same as an inclination angle of the front half of the one lateral section 13S1 of the inner rod 13 with respect to the vehicle front-rear direction.

Figure 4:
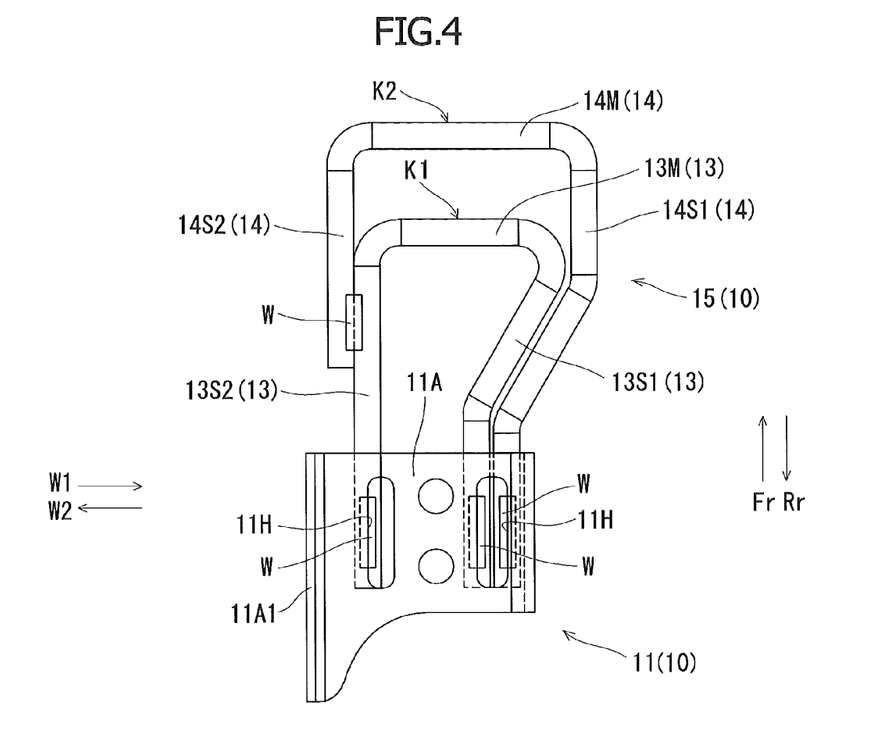
FIG. 4 is a plan view of the striker.
Figure 5:
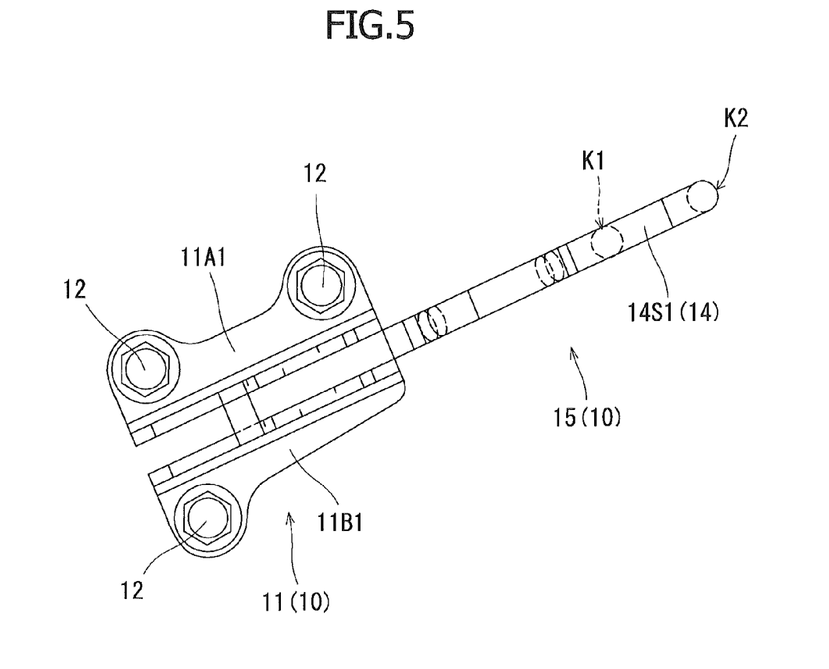
FIG. 5 is view of a striker as viewed from a vehicle width direction inner side.

A rear end portion (an end portion on the vehicle rear side Rr) of the one lateral section 14S1 of the outer rod 14 linearly extends from a rear end of the inclined longitudinal-direction intermediate portion toward the vehicle rear side Rr. This rear end portion is interposed between the upper piece 11A and the lower piece 11B of the base portion 11 and is fixedly attached to both of the upper and lower pieces 11A, 11B by welding. FIG. 4 shows the welded portions W.

An end portion of the other lateral section 14S2 of the outer rod 14 on the vehicle rear side Rr is disposed away from, and on the vehicle front side Fr of, the base portion 11.

[Connecting Structure Between Inner Rod 13 and Outer Rod 14]

The front end section 13M of the inner rod 13 and the front end section 14M of the outer rod 14 are arranged parallel to each other to be spaced away in the vehicle front-rear direction. Moreover, the multiple engaged portions K1, K2 are provided respectively and individually in the front end section 13M of the inner rod 13 and the front end section 14M of the outer rod 14. The multiple engaged portions K1, K2 are thus provided in a front end section of the striker main body 15 to be spaced away in the vehicle front-rear direction.

Moreover, both lateral sections 14S1, 14S2 of the outer rod 14 in the vehicle width direction are fitted on both lateral sections 13S1, 13S2 of the inner rod 13 in the vehicle width direction and the other lateral section 14S2 of the outer rod 14 is fixedly attached to the other lateral section 13S2 of the inner rod 13 by welding. FIG. 4 shows the welded portion W.

[Structure of Engaging Portion 30]

As shown in FIG. 1, the engaging portion 30 is formed in a hook shape. The engaging portion 30 is movable and an operation portion for engagement and engagement release of the engaging portion 30 is provided in the rear seat 1. Moreover, the engaging portion 30 and the operation portion work together in such a way that the engaging portion 30 engages with any one of the multiple engaged portions K1, K2.

The engaging portion 30 is configured to be capable of changing its position in an up-down direction and in a seat front-rear direction and is also configured to be turnable about a horizontal shaft. The engaging portion 30 can thereby selectively engage with any one of the multiple engaged portions K1, K2. Reference symbol X denotes a turning direction of the engaging portion 30 in the case in which the engaging portion 30 engages with the engaged portion K2. The engaging portion 30 may be formed of movable means other than the movable means described above to selectively engage with any one of the multiple engaged portions K1, K2.

According to the Configuration Described Above:

(1) The striker main body 15 includes the inner rod 13 and the outer rod 14. Accordingly, when force toward the vehicle front side Fr is applied to the seat back 3, a tensile load is applied to the inner rod 13 and the outer rod 14 from the engaging portion 30 of the seat back 3.

In such a structure, the strength of the striker main body 15 is relatively less dependent on the diameters of the inner rod 13 and the outer rod 14. As a result, this structure is advantageous in strength and can avoid an increase in the diameters of the inner rod 13 and the outer rod 14 and an increase in weight due to addition of a reinforcement. Moreover, an increase in the number of parts can be suppressed.

Hence, the striker main body 15 can sufficiently withstand force applied thereto from the engaging portion 30 of the seat back 3 and the lock structure can thereby suppress deformation of the striker main body 15 (bending of the inner rod 13 and the outer rod 14) and improve the durability of the striker main body 15 while achieving weight reduction and reduction in the number of parts.

(2) Since both lateral sections 14S1, 14S2 of the outer rod 14 in the vehicle width direction are fitted on both lateral sections 13S1, 13S2 of the inner rod 13 in the vehicle width direction, the one lateral section 13S1 of the inner rod 13 on the vehicle width direction inner side W1 and the one lateral section 14S1 of the outer rod 14 on the vehicle width direction inner side W1 can support each other while the other lateral section 13S2 of the inner rod 13 on the vehicle width direction outer side W2 and the other lateral section 14S2 of the outer rod 14 on the vehicle width direction outer side W2 can support each other.

As a result, the strength of the inner rod 13 and the outer rod 14 (striker main body 15) against loads toward the vehicle front side Fr and a vehicle lower side can be improved.

(3) Since the one lateral section 13S1 of the inner rod 13 on the vehicle width direction inner side W1 and the one lateral section 14S1 of the outer rod 14 on the vehicle width direction inner side W1 are located farther away from, and on the vehicle width direction inner side W1 of, the lateral portion of the vehicle body than the other lateral section 13S2 of the inner rod 13 on the vehicle width direction outer side W2 and the other lateral section 14S2 of the outer rod 14 on the vehicle width direction outer side W2 are, the one lateral section 13S1 and the one lateral section 14S1 are more likely to be bent and deformed.

In the configuration described above, in such a structure, a region of one lateral section of the striker main body 15 (the inner rod 13 and the outer rod 14) on the vehicle width direction inner side W1 which is fixedly attached to the base portion 11 by welding is larger than a region of the other lateral section of the striker main body 15 on the vehicle width direction outer side W2 which is fixedly attached to the base portion 11 by welding. Accordingly, the resistance of the striker main body 15 (the inner rod 13 and the outer rod 14) against a bending load can be improved.

Moreover, since the end portion of the other lateral section 14S2 of the outer rod 14 on the vehicle rear side Rr is disposed away from, and on the vehicle front side Fr of, the base portion 11, the length of an outer rod material can be reduced compared to, for example, a structure in which the end portion of the other lateral section 14S2 of the outer rod 14 on the vehicle rear side Rr is fixedly attached to the base portion 11 by welding. Accordingly, it is possible to reduce the material cost and reduce the weight.

Figure 6:
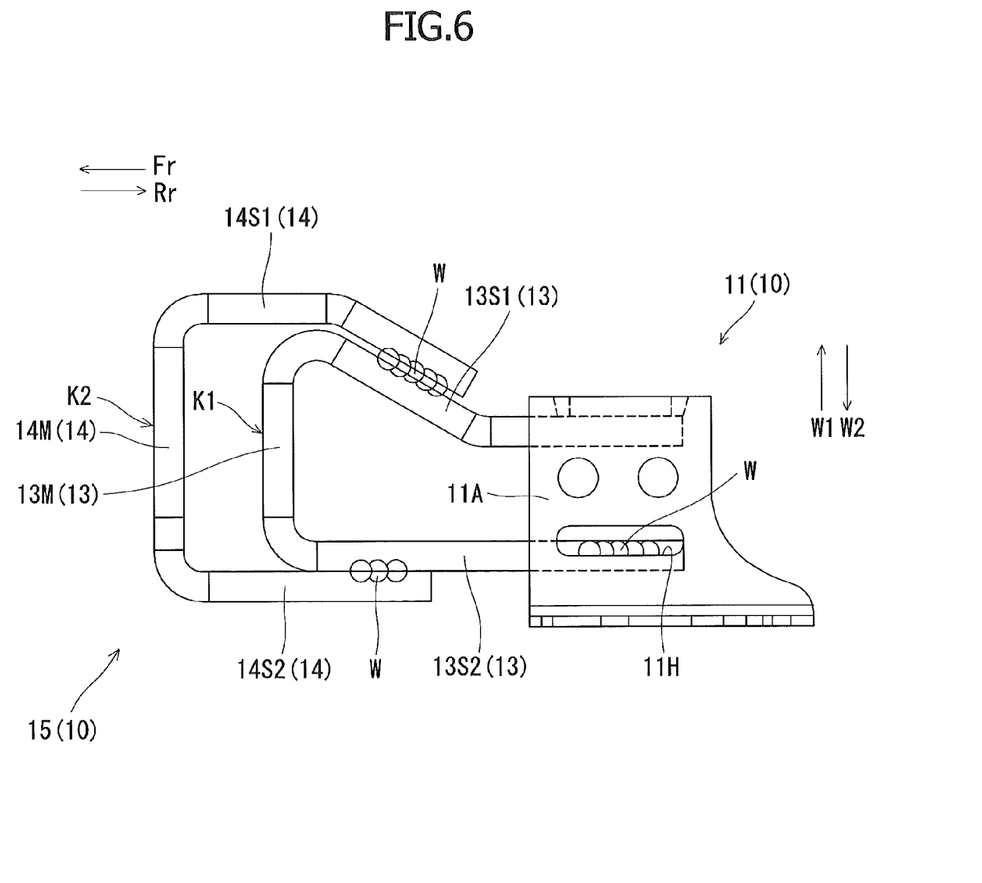
FIG. 6 is a plan view of a striker of another embodiment.

It is possible to employ a structure shown in FIG. 6 in which: the inner rod 13 has the end portion, on the vehicle rear side Rr, of the one lateral section 13S1 on the vehicle width direction inner side W1 and the end portion, on the vehicle rear side Rr, of the other lateral section 13S2 on the vehicle width direction outer side W2 which are fixedly attached to the base portion 11 by welding; both lateral sections 14S1, 14S2 of the outer rod 14 in the vehicle width direction are fixedly attached respectively and individually to both lateral sections 13S1, 13S2 of the inner rod 13 in the vehicle width direction by welding; and the end portions, on the vehicle rear side Rr, of both lateral sections 14S1, 14S2 of the outer rod 14 in the vehicle width direction are disposed away from, and on the vehicle front side Fr of, the base portion 11. Reference symbol W denotes welded portions.

In this configuration, since the end portions, on the vehicle rear side Rr, of both lateral sections 14S1, 14S2 of the outer rod 14 in the vehicle width direction are disposed away from, and on the vehicle front side Fr of, the base portion 11, the length of an outer rod material can be reduced compared to, for example, a structure in which the end portions, on the vehicle rear side Rr, of both lateral sections 14S1, 14S2 of the outer rod 14 in the vehicle width direction are fixedly attached to the base portion 11. Accordingly, it is possible to reduce the material cost and reduce the weight.

As described above, the end portions, on the vehicle rear side Rr, of both lateral sections 14S1, 14S2 of the outer rod 14 in the vehicle width direction are disposed away from, and on the vehicle front side Fr of, the base portion 11. However, since both lateral sections 14S1, 14S2 of the outer rod 14 in the vehicle width direction are fixedly attached respectively and individually to the lateral sections 13S1, 13S2 of the inner rod 13 in the vehicle width direction by welding, it is possible to firmly integrate the inner rod 13 and the outer rod 14 to each other and improve the strength of the inner rod 13 and the outer rod 14.

Three or more engaged portions may be provided in the end section of the striker main body 15 on the vehicle front side Fr to be spaced away in the vehicle front-rear direction.

The above is a description of the embodiment of the present invention. The present invention is not limited to the above-described embodiment, and various modifications and changes can be made based on the technical concept of the present invention.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

That which is claimed:

1. A lock structure for a seat back of a vehicle seat comprising:
    a striker including a plurality of engaged portions and provided on a vehicle body side; and
    an engaging portion provided in a seat back capable of tilting in a vehicle front-rear direction,
    the engaging portion being configured to selectively engage with any one of the plurality of engaged portions to lock the seat back in an inclined posture,
    an inclination angle of the seat back in the inclined posture being different depending on the selected engaged portion, wherein
    the striker includes: a base portion fixed to the vehicle body; and
    a striker main body protruding from the base portion toward a vehicle front side, and
    the plurality of engaged portions are provided in an end section of the striker main body on the vehicle front side to be spaced away in the vehicle front-rear direction.

2. The lock structure for a seat back of a vehicle seat according to claim 1, wherein
    the striker main body includes: an inner rod having a semi-annular shape in a plan view, the inner rod protruding from the base portion toward the vehicle front side; and
    an outer rod having a semi-annular shape in the plan view, the outer rod protruding from the base portion toward the vehicle front side and surrounding the inner rod,
    an end section of the inner rod on the vehicle front side and an end section of the outer rod on the vehicle front side are arranged to be spaced away in the vehicle front-rear direction, and
    the plurality of engaged portions are provided respectively and individually in the end section of the inner rod on the vehicle front side and the end section of the outer rod on the vehicle front side.

3. The lock structure for a seat back of a vehicle seat according to claim 2, wherein both of lateral sections of the outer rod in a vehicle width direction are fitted on both of lateral sections of the inner rod in the vehicle-width-direction.

4. The lock structure for a seat back of a vehicle seat according to claim 3, wherein
    one lateral section of the base portion is fixed to a lateral portion of the vehicle body and the base portion protrudes from the lateral portion of the vehicle body toward a vehicle width direction inner side,
    the inner rod has an end portion, on a vehicle rear side, of one lateral section on the vehicle width direction inner side and an end portion, on the vehicle rear side, of the other lateral section on a vehicle width direction outer side which are fixedly attached to the base portion,
    the outer rod has an end portion, on the vehicle rear side, of one lateral section on the vehicle width direction inner side which is fixedly attached to the base portion and the other lateral section on the vehicle width direction outer side is fixedly attached to the other lateral section of the inner rod, and
    an end portion, on the vehicle rear side, of the other lateral section of the outer rod is disposed away from, and on the vehicle front side of, the base portion.

5. The lock structure for a seat back of a vehicle seat according to claim 3, wherein
    one lateral portion of the base portion is fixed to a lateral portion of the vehicle body and the base portion protrudes from the lateral portion of the vehicle body toward a vehicle width direction inner side,
    the inner rod has an end portion, on a vehicle rear side, of one lateral section on the vehicle width direction inner side and an end portion, on the vehicle rear side, of the other lateral section on a vehicle width direction outer side which are fixedly attached to the base portion,
    both of the lateral sections of the outer rod in the vehicle width direction are fixedly attached respectively and individually to both of the lateral sections of the inner rod in the vehicle width direction, and
    end portions, on the vehicle rear side, of both of the lateral sections of the outer rod in the vehicle width direction are disposed away from, and on the vehicle front side of, the base portion.

* * * * *